R. HANSEN.
TRANSMITTER.
APPLICATION FILED MAY 1, 1907.

916,950.

Patented Mar. 30, 1909.

Witnesses:
Harael C. Prado
David S. Hulfish

Rasmus Hansen,
Inventor.
by McMeen&ween
Attorneys

UNITED STATES PATENT OFFICE.

RASMUS HANSEN, OF MUSKEGON, MICHIGAN, ASSIGNOR OF ONE-HALF TO INTERSTATE SUPPLY COMPANY, OF SIOUX CITY, IOWA, A CORPORATION OF IOWA.

TRANSMITTER.

No. 916,950.   Specification of Letters Patent.   Patented March 30, 1909.

Application filed May 1, 1907. Serial No. 371,354.

*To all whom it may concern:*

Be it known that I, RASMUS HANSEN, a subject of the King of Denmark, and a resident of Muskegon, county of Muskegon, and State of Michigan, have invented a new and useful Improvement in Transmitters, of which the following is a specification.

My invention pertains to details of construction in telephone transmitters, and has as its object the provision of convenient, flexible and reliable means for adjusting a carbon cell in the bridge, as well as improved details in assembling the elements of a carbon cell.

As means for adjusting the carbon cell in the bridge, I provide a split bridge of such conformation as to provide elastic sections permitting the required movement of the two sides of the bridge toward each other to clamp the carbon cell, and providing at the same time convenience for mounting insulated terminals for the electrodes of the carbon cell. In the carbon cell I provide a construction which produces the complete cell with a minimum number of structural parts.

Figure 1:
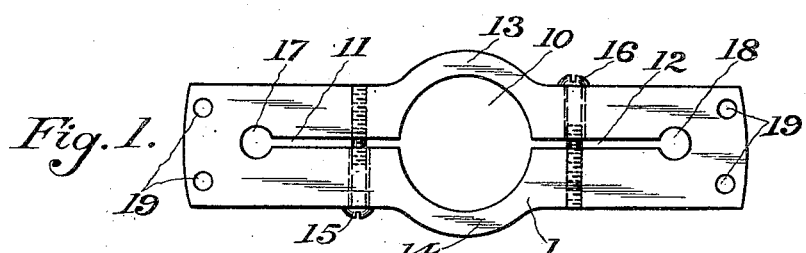
Figure 2:
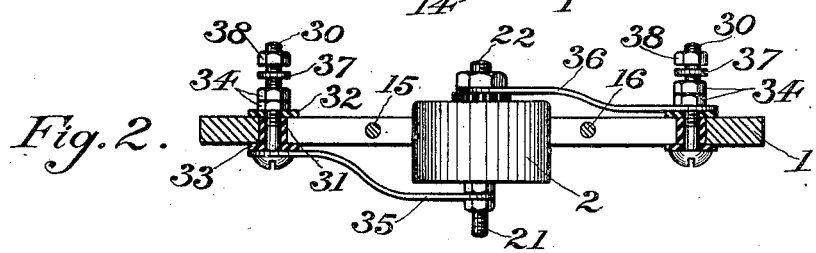
Figure 3:
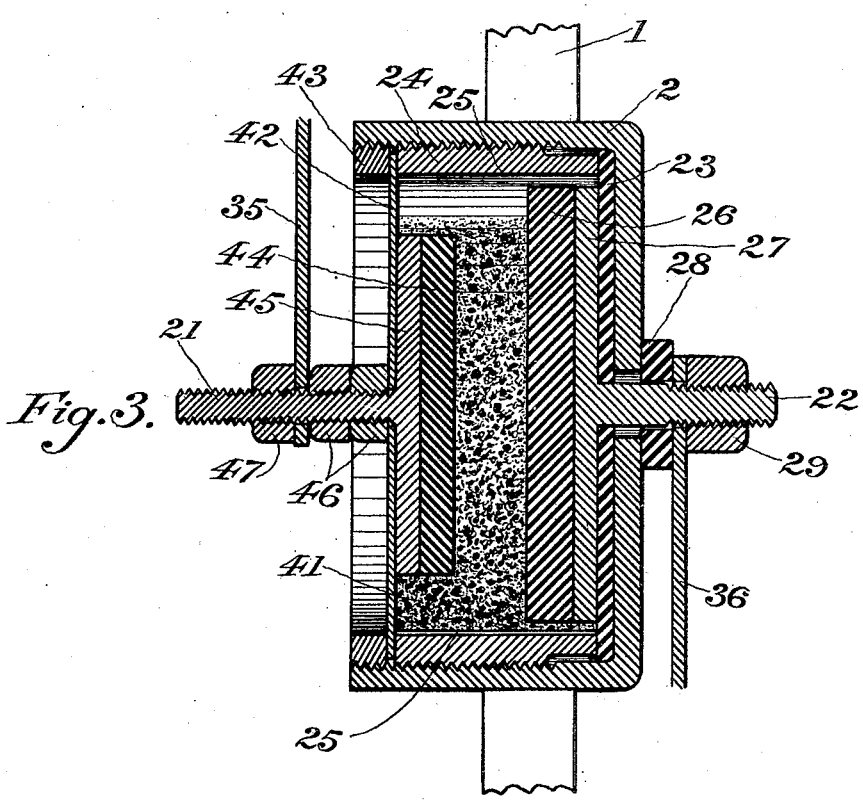

In the drawings, Figure 1 shows the plan of my split bridge with clamping screws in place; Fig. 2 shows a section through the slot of the bridge, showing the carbon cell and terminals in place; and Fig. 3 shows a section of the carbon cell.

In Fig. 1, 1 is a plane piece of metal bored at 10 to receive the carbon cell. From the opening 10 for the carbon cell extend two slots 11 and 12, lending an elasticity to the semi-circular yokes 13 and 14, which together surround the opening 10. Clamping screws 15 and 16 are adapted to draw together the yokes 13 and 14 by drawing together the sides of the slots 11 and 12. I accordingly facilitate the clamping of the carbon cell in the opening 10 by enlarging the ends of the slots into the holes 17 and 18 to reduce the cross section of the bridge at the ends of the slots. This forms, as it were, spring hinges upon which the yokes 13 and 14 may swing, the clamping of the carbon cell in the opening 10 thus being very much facilitated and being rendered more accurate on account of the ease with which the screws 15 and 16 may be turned into final adjustment; it also permits a greater variation in the outside dimension of the carbon cell, inasmuch as with a given strain upon the screws 15 and 16 a greater deflection of the yokes 15 and 16 may be attained and by the use of a reasonably wide slot at 11 and 12 a great range of adjustment between yokes 13 and 14 may be had, due to the ease with which the metal of the bridge may be sprung at the section opposite the holes 17 and 18. Further the holes 17 and 18 are designed to receive and hold terminals for convenient connection of leading-in wires to the electrodes of the carbon cup, the elasticity of the parts of the bridge being in no wise affected by the presence of the terminals in the holes 17 and 18. Holes 19 are drilled for convenience in attaching the bridge to the frame of the transmitter case. As the bridge is flat, it may be punched from heavy sheet metal and thus may be made at a very low cost.

In mounting the carbon cell in the bridge, a carbon cell 2 having a rigid cup is required. The terminals or binding posts consist each of a screw 30, an insulating bushing 31, two insulating washers 32—33 and two lock nuts 34. Conductors from the electrodes of the carbon cell are shown at 35—36, the conductor 35, being upon the side of the bridge having the head of the screw 30, is placed under the head of the screw thereby extending its circuit through the screw; the conductor 36, being upon the opposite side of the bridge, is placed under the lock nuts 34 and its circuit thus is carried to the body of the screw 30. Washers 37 and the clamping nuts 38 are provided to clamp the leading-in wires.

The adjustment of the carbon cell is attained by placing the carbon cell in the opening 10 and attaching its conductors 35—36 to the terminals or binding posts as just described. The bridge is then placed in the transmitter frame and the stud 21 of the carbon cell is attached to the diaphragm of the transmitter. The diaphragm is vibrated to adjust the carbon cell loosely into position in the bridge and the cell then is clamped in that desired position by tightening the screws 15—16, thus drawing the yokes 13—14 down closely upon the shell of the carbon cup and locking it permanently.

Turning to Fig. 3, 2 represents the outer shell of the carbon cup. This is internally threaded and drilled centrally to give ample clearance around the stud 22 of the back electrode. The assembly of the carbon cup is as follows: Within the shell 2 is placed, first, a closely fitting insulating washer 23 drilled centrally to clear very closely the stud 22 of the back electrode, a space ring 24 is screwed down upon the insulating washer 23. This space ring determines the spacing or distance of the front electrode from the back electrode and takes its name from that function. Its inner cylindrical surface 25 is insulated by a coating of shellac before applying the space ring, or may be insulated by placing a strip of paper inside the ring after it is screwed into position; the double line at 25 illustrates the insulation of the surface. The back electrode consisting of a carbon disk 26 mechanically fastened to the brass back plate 27, which back plate has the central stud 22, then is placed within the cup and through the insulating washer 23. The insulating washer 28 is placed over the stud outside the cup, the leading-in conductor 36 is placed upon the stud 22 outside the washer 28, and the lock nut 29 is screwed down, clamping in place the leading-in conductor 29 and the back electrode 26. The insulating washer 23 centers the stud 22 in the central opening through the back of the cup 2 and insulation from the cup thus is provided by that air space and by the washers 23 and 28. A measured quantity of granular carbon 41 is placed within the cup and the diaphragm 42 is placed upon the edge of the space ring 24 and clamped in place by the lock nut 43. Preliminarily the front electrode 44, mechanically attached to the metal support 45, which metal support has the central stud 21, has been attached to the diaphragm 42 by nuts 46 and leading-in conductor 35 has been attached to the stud 21 by the nut 47.

Having thus described my invention, what I claim as new and desire to secure by United States Letters Patent is:

1. In a telephone transmitter, a slotted bridge having the ends of the slot enlarged, and binding post terminals for leading-in wires mounted in and through the enlarged ends of the slot, substantially as described.

2. In a telephone transmitter, a split bridge and binding post terminals for the carbon cell electrodes mounted in and upon said bridge, said terminals being located in the ends of the slot of the bridge, substantially as described.

3. In a telephone transmitter, a split bridge having a slot so conformed as to receive the carbon cell of the transmitter and the anchor portions of binding post terminals for the carbon cell electrodes, substantially as described.

4. In a telephone transmitter, a split bridge of reduced cross section at the zone of the ends of the slot, said reduced cross section being attained by enlarging the ends of the slot; and binding post connector terminals for the carbon cell electrodes and for leading-in conductors, said connector terminals being anchored by elements thereof passed through the enlarged openings at the ends of the slot of the bridge, substantially as described.

Signed by me at Sioux City, county of Woodbury and State of Iowa, in the presence of two witnesses.

RASMUS HANSEN.

Witnesses:
MAX MCGRAW,
R. H. COOMES.